(12) United States Patent
Asmussen et al.

(10) Patent No.: US 11,520,649 B2
(45) Date of Patent: Dec. 6, 2022

(54) STORAGE MOUNTING EVENT FAILURE PREDICTION

(71) Applicant: International Business Machines Corporation, Armonk, NY (US)

(72) Inventors: Ole Asmussen, Henstedt-Ulzburg (DE); Robert Beiderbeck, Wassenberg (DE); Ying Li, Mohegan Lake, NY (US); Erik Rueger, Ockenheim (DE); Markus Schäfer, Heiligenmoschel (DE)

(73) Assignee: International Business Machines Corporation, Armonk, NY (US)

(*) Notice: Subject to any disclaimer, the term of this patent is extended or adjusted under 35 U.S.C. 154(b) by 1057 days.

(21) Appl. No.: 16/191,975

(22) Filed: Nov. 15, 2018

(65) Prior Publication Data

US 2020/0159601 A1 May 21, 2020

(51) Int. Cl.
| | | |
|---|---|---|
| *G06F 11/07* | (2006.01) | |
| *G06F 16/903* | (2019.01) | |
| *G06K 9/62* | (2022.01) | |
| *G06N 20/00* | (2019.01) | |

(52) U.S. Cl.
CPC ...... *G06F 11/076* (2013.01); *G06F 16/90335* (2019.01); *G06K 9/6256* (2013.01); *G06N 20/00* (2019.01)

(58) Field of Classification Search
CPC ............... G06F 11/076; G06F 11/0754; G06K 16/90335; G11B 15/689; G11B 20/1816; G11B 20/18; G06N 20/00; G06N 5/003; G06N 5/025
See application file for complete search history.

(56) References Cited

U.S. PATENT DOCUMENTS

| | | | |
|---|---|---|---|
| 2013/0083638 A1* | 4/2013 | Edling | G11B 15/689 |
| 2014/0146648 A1 | 5/2014 | Alber et al. | |
| 2015/0243323 A1 | 8/2015 | Moody, II et al. | |
| 2017/0168733 A1 | 6/2017 | Ahmad et al. | |
| 2019/0361784 A1* | 11/2019 | Savanur | G06K 9/6282 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Manuel L Barbee
(74) *Attorney, Agent, or Firm* — Jared L. Montanaro

(57) ABSTRACT

A processor may provide a machine learning model. The machine learning model may have an input and an output. The processor may receive input data. The input data may include log data of a queried storage medium and a queried media drive. The processor may provide the input data to the input of the machine learning model. The processor may determine, from the output of the machine learning model, a predicted failure cause category and a predicted failure probability assigned to the predicted failure cause category. The processor may provide a first prediction to a user.

19 Claims, 8 Drawing Sheets

STORAGE MOUNTING EVENT FAILURE PREDICTION

BACKGROUND

The present disclosure relates generally to the field of automated prediction of potential failure events, and more specifically to the automated prediction of potential failure events expected to occur when mounting a storage medium by a media drive.

Current storage solutions providers have installed more than 20,000 tape libraries with more than 100,000 tape drives and millions of tapes worldwide. Attempting to obtain a significant product quality overview would mean analyzing a huge amount of data.

Currently, a support center has to rely on the drive dump data that is manually forced in most cases. This means if a problem has been reported for a tape drive, it is necessary to go on site and perform a tape drive device test with a diagnostic tape cartridge. This action needs to be done by a human resource and gives just an overview about the current tested drive.

On the other hand, there is often no process in place that saves cartridge-related information automatically. Obtaining such information would mean to mount the cartridge of interest into a tape drive and force a cartridge memory dump. This procedure would have to be repeated for each tape within the library to obtain a significant dataset for this single library. Moreover, even if a full set of current metadata such as log data of the most recent mount events, including read-write operations, was available, this would yield only a snapshot of the current tape and drive performance.

SUMMARY

Embodiments of the present disclosure include a method, computer program product, and system for automatically predicting a failure event associated with mounting storage devices. A processor may provide a machine learning model. The machine learning model may have an input and an output. The processor may receive input data. The input data may include log data of a queried storage medium and a queried media drive. The processor may provide the input data to the input of the machine learning model. The processor may determine, from the output of the machine learning model, a predicted failure cause category and a predicted failure probability assigned to the predicted failure cause category. The processor may provide a first prediction to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
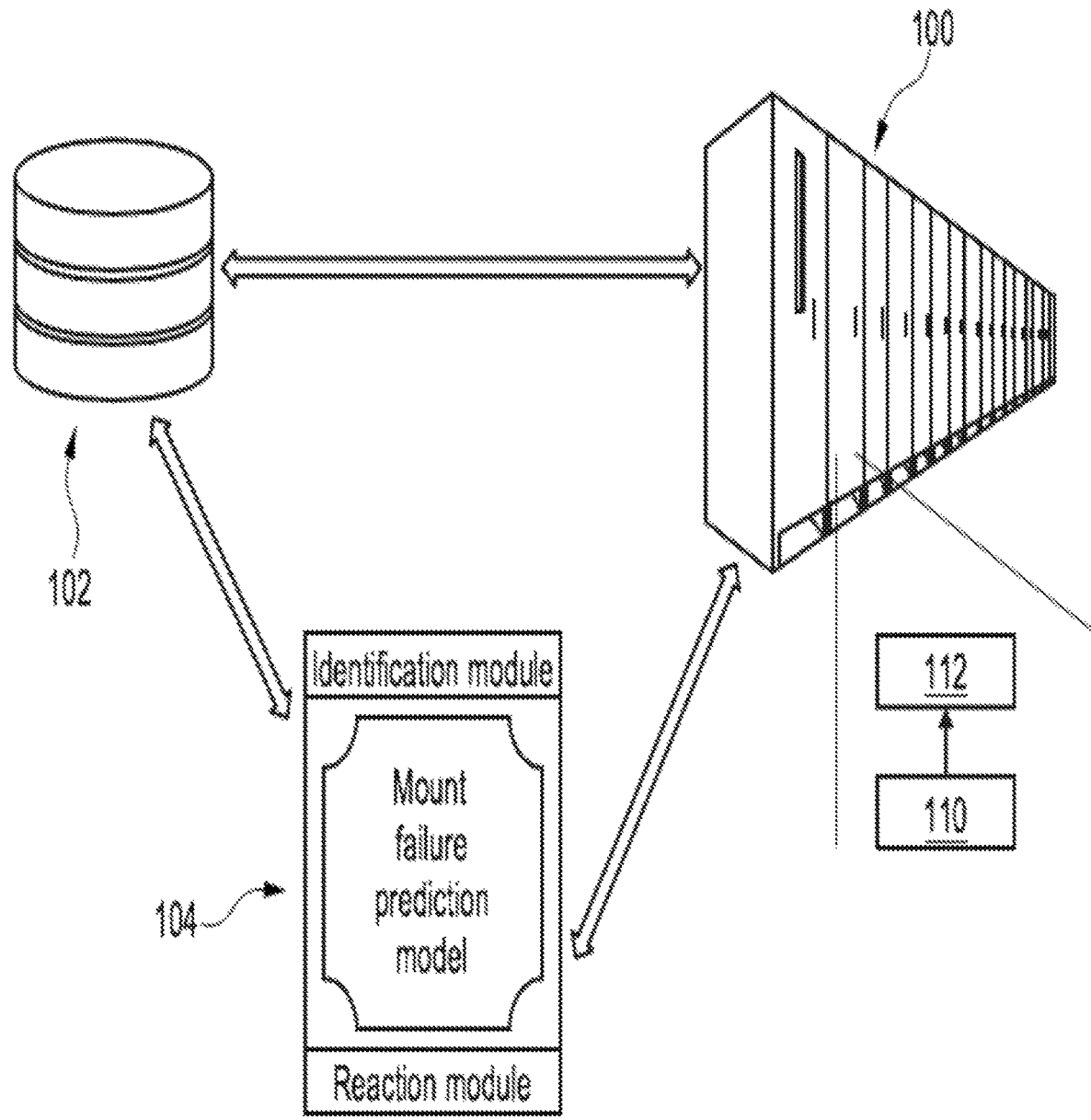
FIG. 1 depicts a computer system environment adapted for deploying a mount failure prediction machine learning model, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of automated prediction of potential failure events, and more specifically to the automated prediction of potential failure events expected to occur when mounting a storage medium by a media drive, in particular a media library. While the present disclosure is not necessarily limited to such applications, various aspects of the disclosure may be appreciated through a discussion of various examples using this context.

Current operations of media libraries such as tape libraries usually allow for a reactive management of mount-time failures (e.g., read-write errors caused by wear of the data carrier or the drive hardware). An investigation of failure causes can be labor intensive and gives only a limited insight to the functioning of the particular library that is analyzed. Insight to fundamental failure causes on a global scale (e.g., applying to a large number of storage media, media drives, and media libraries a storage service provider has installed on all devices worldwide) is difficult to obtain because relevant metadata (e.g., log data of past mount events) is usually stored and distributed offline (e.g., in the cartridge memory of each tape cartridge).

In some embodiments, the present disclosure may provide the advantage of predicting a likelihood that the queried combination of a particular storage medium and a particular media drive might fail for one reason subsumed in the predicted failure cause category. Therefore, the queried mount event, that does not necessarily have to be started already, can be prevented if the output gives reason to assume that the risk of mounting the queried medium by the queried drive (that may include performing read and/or write operations on the data carrier of the storage medium) is too high. This may prevent damage from the queried storage medium and/or the queried media drive without having to perform the queried mount event at all.

The provided prediction may comprise more than one probability, and more than one probability may correspond to a failure cause subsumed in the same category. For example, the storage medium may fail for several reasons, each of which having assigned a separate, independent predicted failure probability, but all these failure causes are medium-related and are therefore assigned to a predicted failure cause category representing a potential damage of the storage medium. A predicted failure probability may represent a single failure cause (e.g., a single classification path of the model) or be an aggregate value (e.g., a maximum, arithmetic average or median) representing multiple failure causes (e.g., multiple classification paths of the model).

In some embodiments, a processor uses a trained machine learning model to provide the first prediction. The processor may provide the machine learning model, which may have an input and an output. The processor may receive input data. The input data may include log data of a queried storage medium and a queried media drive. The processor may provide the input data to the input of the machine learning model. The processor may determine, from the output of the machine learning model, a predicted failure cause category and a predicted failure probability assigned to the predicted failure cause category. The processor may provide a first prediction to a user.

The trained machine learning model may be based on a set of categorized training data. This categorization may imply a coarsening of information and thus reduce the need to define each particular failure cause that might occur in terms of single or combined metadata attributes. In some embodiments, the trained machine learning model may be based on predetermined failure cause categories and contain logical patterns that were created during the completed training by identifying coincidences of said metadata attributes that are assumed to correspond to the actual failure causes that led to the respective categorization. Therefore, the trained machine learning model is capable of recognizing the same failure-indicative attribute combinations in new metadata and thus conclude whether the new metadata contains one or more of these failure indicators.

Moreover, the categorization into failure cause categories may allow the narrowing down of hardware involved in the queried mount event that comprises the actual failure cause, e.g., a defect of the storage medium or the media drive, or even a more precise categorization such as a failure of the cartridge of the storage medium or of the data carrier hosted by the cartridge.

The log data comprised by the input data may be metadata that are typically acquired during a mount event. Such data may comprise various attributes, including, without limitation, static data related to the storage medium (e.g., a manufacturer name, tape length, nominal total storage capacity, storage technology generation identifier, etc.), dynamic data related to the storage medium (e.g., current number of empty sectors, addresses of blocked sectors, current total storage capacity, etc.), static data related to the media drive (e.g., a manufacturer name, model identifier, hardware generation, etc.) and/or dynamic data related to the media drive (e.g., a total number of mounted media since manufacture, current firmware version, etc.). The log data are usually incorporated in a separate storage chip of the media drive or the storage medium (e.g., a cartridge memory chip of a tape cartridge; the storage chip is usually different from the primary data carrier, that would be the magnetic tape in the example of the storage medium being a magnetic tape cartridge).

The prediction may be provided to another process or entity, e.g., a computer program running on the same or a different computer system, or it may be prompted to a user. This may provide the possibility to perform a response action to prevent damage to the involved hardware. In some embodiments, the entity (e.g., the computer system, the different compute system, etc.) provided the prediction may automatically engage with the involved hardware and fix the hardware involved in the predicted failure occurrence. For example, a system may be augmented with a cleaning brush and when provided with a prediction that details the failure of mounting devices due to particulate deposits, the system may use the cleaning brush to automatically remove the particulate deposits. The system thus may prevent the failure of the mounting devices.

In some embodiments, the present disclosure may relate to any type of removable storage media and their corresponding media drives. Examples of storage media include, without limitation, tape media such as magnetic tape cartridges, and disk media such as magnetic or optical disks, and exchangeable hard drives and solid-state drives. A media drive is understood herein as an installed or freestanding unit adapted for mounting the storage medium and performing read and/or write operations on a data carrier of the mounted storage medium.

The term "hardware" as used herein relates to any units, parts, elements, devices, systems, etc., that are functionally related to a mount process of mounting a storage medium by a media drive. This includes, without limitation, units, parts, elements, devices, systems etc., (such as a media drive) that are fixedly installed at a computing device, another electronic device, a rack or other support structure, as well as mobile or exchangeable units, parts, elements, devices, systems etc., (such as a removable storage medium to be mounted by a media drive) related to the mount process.

In some embodiments, the predicted failure cause category is a category from a predefined set of failure cause categories, the set of failure cause categories comprising a medium category representing (e.g., associated with, corresponding to, etc.) the queried storage medium, a drive category representing the queried media drive, and a permit category representing the absence of a failure cause. The medium category and the drive category each having assigned a predetermined probability threshold.

In some embodiments, the processor may perform a response action. The response action may be adapted (e.g., generated, modified, etc.) for preventing the queried mount event for the queried storage medium in case the predicted failure probability assigned to the medium category exceeds the predetermined probability threshold assigned to the medium category. In some embodiments, the response action may be adapted for preventing the queried mount event for the queried media drive in case the predicted failure probability assigned to the drive category exceeds the predetermined probability threshold assigned to the drive category.

In some embodiments, the response action may be adapted for preventing the queried mount event for the combination of the queried storage medium and the queried media drive in case the predicted failure probability assigned to the drive category exceeds the predetermined probability threshold assigned to the drive category and the predicted failure probability assigned to the medium category exceeds the predetermined probability threshold assigned to the medium category. In some embodiments, the response action may be adapted for allowing the queried mount event in case the predicted failure probability assigned to the medium category does not exceed the predetermined probability threshold assigned to the medium category and the predicted failure probability assigned to the drive category does not exceed the predetermined probability threshold assigned to the drive category.

This may provide an appropriate categorization to narrow down potential failure causes to one or more of the involved hardware instances (in this case, the storage medium and the media drive). This may serve as a basis for later decisions on the further procedure of the potentially failing element, e.g., repairing the suspect drive or removing the suspect storage medium from the media library where it is hosted.

A given predicted failure probability may exceed the threshold value of a particular predicted failure cause category and may be considered independent of any further failure probabilities provided by the first prediction. Thus, there may be different failure probabilities that are assigned to different failure cause categories, any of which may exceed the respective predetermined probability threshold of the assigned category.

The set of failure cause categories may contain further categories such as "evidence unsure," "unknown failure," etc., that may be useful, e.g., when updating the machine learning model to resurface the data set at a later time, for a different user, etc. If the number of failure categorizations reaches a predetermined threshold value, the ambiguous dataset may be removed or withheld from the training dataset and optionally stored in a separate "problem cases" storage for later reinvestigation.

In some embodiments, the response action may comprise one and/or a combination of the following:

If the predicted failure probability assigned to the medium category exceeds the predetermined probability threshold assigned to the medium category, the response action may be marking the queried storage medium as discontinued and/or transporting the queried storage medium to a removal site and/or sending a medium failure notification to a computing device of a monitoring center.

If the predicted failure probability assigned to the drive category exceeds the predetermined probability threshold assigned to the drive category, the response action may be marking the queried media drive as discontinued and/or powering off the queried media drive and/or setting the queried media drive to a standby mode and/or sending a drive failure notification to a computing device of a monitoring center.

If the predicted failure probability assigned to the medium category exceeds the predetermined probability threshold assigned to the medium category and the predicted failure probability assigned to the drive category exceeds the predetermined probability threshold assigned to the drive category, the response action may be selecting a different media drive as the queried media drive and receiving second input data. In some embodiments, the second input data may include log data of the queried storage medium and the queried media drive. In some embodiments, the response action may further include providing the second input data to the input of the machine learning model; receiving from the output of the machine learning model a second prediction of a predicted failure cause category and a predicted failure probability assigned to the predicted failure cause category; and providing the second prediction.

It is noted that the above-mentioned response actions may provide a comprehensive set of measures for responding to the detection of a potential failure. For instance, a suspect storage medium can be sorted out of a library to prevent damage of the medium, data loss, or damage caused to any media drives mounting the suspect medium; or marking a suspect storage medium as discontinued may enable a later control of the drive by a technician.

In some embodiments, the set of failure cause categories may include a combination category representing the combination of the queried storage medium and the queried media drive. The response action in such an instance may include preventing the queried mount event for the combination of the queried storage medium and the queried media drive in case the predicted failure probability assigned to the combination category exceeds the predetermined probability threshold assigned to the combination category; and/or the permit category having assigned a predetermined probability threshold, the response action may be further adapted for allowing the queried mount event if the predicted failure probability assigned to the permit category exceeds the predetermined probability threshold assigned to the permit category.

Defining a combination category may provide the benefit of predicting failures with a probability that exceeds neither the predetermined probability threshold of the drive category nor that of the medium category, but only occur for the queried combination of the specific queried media drive with the specific queried storage medium. This may be the case, e.g., if a media drive of a first manufacturer has a reduced compatibility (that may be unknown or unofficial) with storage media of a second manufacturer or a particular media generation.

A predetermined probability threshold may be useful, e.g., for suppressing a further failure cause analysis if the probability assigned to the permit category exceeds a threshold. In this case, the method can be abridged as the total probability of a failure is considered low.

In some embodiments, the receiving of the predicted failure cause category and the predicted failure probability may include receiving, from the output of the machine learning model, a classification path assigned to the predicted failure probability. The response action in such a case may be to store, in a path statistics file, the classification path assigned to the predicted failure probability and the predicted failure category assigned to the predicted failure probability.

In some embodiments, the path statistics file may facilitate a more detailed (e.g., "atomic") failure cause analysis, including a global analysis of the most frequent failure causes, which may be used for triggering efforts to avoid these failures in the future. The path statistics file may be grouped by equivalent classification paths with a counter (e.g., a device, either digital or mechanical, which increases in number depending on the number of occurrences and which can reset to a beginning count number) reflecting the number of occurrences.

It is noted that the relation "classification path assigned to the predicted failure probability" may also refer to the case that the model output contains more than one probability (e.g., more than one classification path) for different failure events in the same category. The probability assigned to the whole category may be an aggregate value (e.g., arithmetic mean of the failure probabilities of all classification paths to failure events assigned to the same category), or alternatively, the probability of a particular path that is selected as a representative value for the whole category (e.g., the path with the largest predicted failure probability).

In the case of an aggregate probability, there are several possibilities for determining a quantitative value of the aggregate probability, for instance: skipping the addition of the classification path to the path statistics file; selecting a representative classification path, e.g., the classification path of the maximum predicted failure probability represented by the aggregate probability, or the path whose associated predicted failure probability is closest to the aggregate probability; adding the aggregate predicted failure probability and its assigned predicted failure cause category to a separate section of the path statistics file, such as "multiple failure causes"; or separately adding to the file multiple classification paths for some or all of the multiple failure probabilities that are represented by the aggregate predicted failure probability, e.g., the classification paths of the three largest or all failure probabilities.

In some embodiments, the present disclosure further lends itself the ability to receive, by the processor, training sets, where each training set may include log data of past mount events of a past storage medium mounted by a past media drive and an assigned predicted failure cause category. In some embodiments, the log data may include environmental data associated to the storage conditions of the storage media and the media drives. For instance, the log data may include information relating the humidity and temperature of the storage media and media drives, this may allow the machine learning model to identify that a storage media may not have been properly stored and that humidity and temperature likely damaged the information (e.g., drivers, firmware, etc.) on the storage media, or damaged (e.g., rusted) metal components of the storage media and/or media drives. In some embodiments, the processor may execute a learning algorithm on the training sets to generate the machine learning model.

It is noted that the above mentioned ability may provide the possibility to generate the machine learning model for the first time and to update the training model with an improved (e.g., larger) training dataset (e.g., the entirety of the training sets). In some embodiments, a system generating the machine learning model may update the machine training model by utilizing a neural network that weights one or more factors associated with the log data. For instance, the neural network may identify from multiple sources that a tape cartridge is most likely to be the cause of failure when mounting with a tape drive, thus the tape cartridge may be given a higher weight/rank when determining the first prediction.

In some embodiments, a ground-truth categorization may be provided to the machine learning model by a user (preferably by various users in a distributed effort) and/or automatically by a separate system (e.g., a cloud server, a storage center, etc.). In some embodiments, user interaction during categorization may be facilitated, e.g., by a grouped display of attributes. Attributes in the log data may be pre-filtered to rule out attributes that are assumed to have a negligible predictive power (e.g., age of a mounting/mountable unit, size of a mounting/mountable unit, etc.). This may increase calculational efficiency by reducing the number of free model parameters.

In some embodiments, training the machine learning model may include testing the machine learning model on a categorized test dataset that is not used for the generation of the machine learning model (e.g., training the machine learning model in a sandbox environment before presenting the machine learning model to a user and/or a system). In some embodiments, the learning algorithm may include one or more complexity reduction measures such as pruning, e.g., identifying the parameters with the highest relevant statistical weights and reducing the machine learning model accordingly, resulting in a simplified machine learning model. It is noted that a simplified machine learning model allows the processor and/or system utilizing the machine learning model to more efficiently and more quickly process the machine learning model because less resources (e.g., compute resources, memory resources) are required for processing the machine learning model after simplification.

In some embodiments, the learning algorithm may be and/or include a decision tree learning algorithm. This may reduce the hardware requirements for implementing the machine learning model. Examples of decision tree learning algorithms include, without limitation, a classification and regression tree analysis (C&R or CART); iterative dichotomizer 3 (ID3); C4.5; C5.0; chi-squared automatic interaction detector (CHAID); quick, unbiased, efficient statistical tree (QUEST); multivariate adaptive regression splines (MARS); and Conditional Inference Trees.

In some embodiments, the decision tree learning algorithm may be and/or include a classification and regression tree learning algorithm. A classification and regression (C&R) tree analysis may provide a reliable model with efficient usage of computing resources by consolidating information to a select amount of hardware computing resources.

In some embodiments, the present disclosure lends itself the ability, by use of the processor, to store the input data in a database (e.g., a cloud-based database, a cloud-base server and/or client, etc.). A database of input data may facilitate a collection and subsequent analysis (e.g., comparison, statistics, etc.) of a group of storage media and media drives of interest. This includes the possibility to obtain usage and/or failure information on a global scale, which may be useful, e.g., for a storage provider to avoid identified failure causes in the future, or for a user operating a distributed storage system to optimize available media drives and/or storage media for a more reliable performance by reducing the failure rate.

In some embodiments, the possessor may store log data of some or all medium-drive combinations that were queried for the prediction and/or actually mounted. In an example, the database comprises a three-dimensional array with an identifier of the media drive as the first coordinate, an identifier of the storage medium as the second coordinate, and an identifier of the mount event (e.g., a time stamp or a consecutive number) as the third coordinate. In some embodiments, an equivalent storage function may be implemented using two tables (e.g., one table storing the coordinates "drive vs. mount number" for each medium and one table storing the coordinates "medium vs. mount number" for each drive).

In some embodiments, the log data of the queried storage medium and the queried media drive may include a mount quality category; the mount quality category may be selected from a set of mount quality categories. In some embodiments, the processor may generate a quality statistics file, the quality statistics file may include a counter value for each mount quality category in the set of mount quality categories, the generation of the quality statistics file may include reading the mount quality category for the past mount events of the queried storage medium by the queried media drive stored in the database and increasing the counter value of the read mount quality category. In some embodiments, the processor may provide (e.g., incorporate, embed, etc.) the quality statistics file with the first prediction.

In some embodiments, mount quality categories may be implemented, e.g., as integer numbers that are calculated during or after each mount of a storage medium by a media drive. This function may be available as a standard feature, e.g., in generations of the Linear Tape-Open (LTO) magnetic tape storage technology. This constitutes a decentralized analysis in advance that may be correlated with the predicted failure probability predicted by the machine learning model.

In this way, more refined response actions may be defined based on the correlation of the mount quality with the predicted failure probability. For instance, an input dataset is predicted to have a predicted failure probability of 61% in one category with an associated predetermined probability threshold of 50%, but the quality statistics file indicates a constantly high mount quality over the last three weeks. The failure category has assigned a second threshold of 80% for this case. In response, the mount event is allowed because the predicted failure probability is still on the tolerance range, while the same mount event is prevented six weeks later because the predicted failure probability in this category has deteriorated to 84%.

In some embodiments, the log data of the queried storage medium and the queried media drive may include a mount quality category. The mount quality category may be selected from a set of mount quality categories. In some embodiments, the processor may generate a quality statistics file, the quality statistics file may include a medium-centered counter value for each mount quality category in the set of mount quality categories and a drive-centered counter value for each mount quality category in the set of mount quality categories, the generation of the quality statistics file may include the processor reading, in the database, the mount quality category for past mount events of the queried storage medium by a plurality of different media drives and increasing the medium-centered counter value of each read mount quality category; and reading, in the database, the mount quality category for a past mount event of a plurality of different storage media by the queried media drive and increasing the drive-centered counter value of each read mount quality category. In some embodiments, the processor may provide the quality statistics file with the first prediction.

It is noted that different counters for the mount history of the same medium on different drives as well as different media on the same drive may give a further indication as to whether a failure is likely to be caused by the medium (e.g., poor quality on different drives) or the drive (e.g., poor quality mounting of different media). If both indicators are inconspicuous, this may be indicative of a specific combination of the queried drive and the queried medium that should be avoided. Predefined limits may be implemented to limit the number of past mount event logs to be read, e.g., to not more than 100 mount event logs or all mount event logs of the past three weeks.

In some embodiments, the processor may receive updated training sets. Each updated training set may include log data of a past mount event of mounting a past storage medium by a past media drive and an assigned predicted failure cause category. The processor may execute the learning algorithm on the updated training sets for generating an updated machine learning model.

This may enable a refinement of the machine learning model, thereby improving its predictive power (e.g., with a large number of significant classification paths) and reliability (e.g., with low rates of false positives/false negatives). The database reassessment may be scheduled or event-driven (e.g., every time the number of database entries has grown by 10%, 20%, etc.).

In some embodiments, the processor may generate a new updated training set in response to detecting a failure event in the log data of the past mount event. This may provide the machine learning model with a higher predictive power, e.g., the capability of predicting a larger number of different atomic failure events.

According to embodiments, the processor may receive a request for mounting the queried storage medium and the processor may select from a plurality of media drives an optimal media drive for mounting the queried storage medium. The selection of the optimal media drive may include the processor: providing, for each of the media drives, the input data for the combination of the queried storage medium and the queried media drive as the queried media drive; receiving the first prediction for said combination, the first prediction including a mount quality value. The processor may rank the media drives by the mount quality value in first order and by total mount count of each media drive in second order and the processor may select the highest-ranking idle media drive as the optimal media drive.

This may be beneficial by comparing several outputs of the machine learning model to further reduce the number of actual failures in a library and/or cause a more even wear distribution across the drives of a library. The total mount count of a media drive is the total number of mount events that the drive has completed since its manufacture.

In some embodiments, the mount quality value includes the predicted failure probability and/or the mount quality category. Both may provide a beneficial rating criterion, but other ordered figures or categories may be used as the mount quality value as well to serve a particular statistical purpose.

In some embodiments, the machine learning model includes a classification model. This may provide the prediction with a high predictive power with a low demand of computational resources. Examples of a classification model include, without limitation, a classification table, a decision tree, and a principal component analysis.

In some embodiments, the classification model may be represented by a rule set, the rule set may include conditional statements. A rule set representation of a classification model may provide the first prediction with a reduced consumption of computational resources, which may enable implementations of the machine learning model on non-server hardware such as a controller of a media library.

In some embodiments, the input data may be generated by forcing a memory dump while the queried storage medium is mounted by the queried media drive, and/or by a memory readout while the storage medium is stored outside of the queried media drive.

This may provide two alternative or complementary techniques for acquiring the log data to be included in first and/or second input data. The memory dump during a mount may be beneficial for acquiring the log data from on-board memory of both the storage medium (e.g., "cartridge memory") and the media drive (e.g., "drive memory"). This may enable the acquirement of additional log data that may be stored in the drive memory. Another advantage of the forced memory dump technique may be to limit the number of predictions to actually scheduled mount events. Preferably, the prediction is performed after mounting the storage medium by the media drive, but before performing read-write operations on the data carrier of the storage medium.

It is understood that the cartridge memory is different from the data carrier of the storage medium, as is known from magnetic tape cartridges comprising a magnetic tape as the primary data carrier and an on-chip memory (e.g., the cartridge memory) for storing technical metadata related to the tape, the cartridge, one or more past mount events of the cartridge and/or a media drive involved in such past mount event.

It is noted that a readout of log data during a storage of the storage medium (e.g., in a storage rack of a media library) may increase the amount of available log data and thus provide a more comprehensive catalog for generating an effective machine learning model and/or historical statistic functions such as the generation of a quality statistics file mentioned further above. Time-parallel cartridge memory readout and/or a higher workload of the machine learning model may be advantageously achieved in addition.

It is to be understood that the aforementioned advantages are example advantages and should not be construed as limiting. Embodiments of the present disclosure can contain all, some, or none of the aforementioned advantages while remaining within the spirit and scope of the present disclosure.

Referring now to FIG. 1, which depicts a computer system environment 150 adapted for deploying a mount failure prediction machine learning model, in accordance with embodiments of the present disclosure. The computer system environment 150 comprises a media library 100, a database unit 102, and a computer system 104 (e.g., the "environment units"). The environment units 100, 102, 104 may be integrated within a single system at a single location. Alternatively, one or more of the environment units 100, 102, 104 may be situated at different locations, wherein the detached units are interconnected by a communications infrastructure such as the internet, an intranet, a local-area network (LAN), a local wireless network or the like. If a communications infrastructure is used, the corresponding data are transferred via this infrastructure, e.g., the input data between the computer system 104 and the database 102, or a rule set representation of the machine learning model between the computer system 104 and the media library 100.

The media library 100 comprises one or more media drives 112 (such as a tape drive), one or more storage media 110 (such as a magnetic tape cartridge), and an accessor unit adapted for transporting the storage media between the media drives and a storage location (such as a cartridge storage rack). Each of the one or more media drives 112 is adapted for mounting one or more storage media 110. The one or more media drives 112 include a queried media drive 112 and the one or more storage media 110 include a queried storage medium 110. In some embodiments, a library controller (which is not shown as it may be located on board of or detached from the media library 100) controls the accessor unit and the media drives 112. The library controller is adapted for collecting log data of a queried storage medium of the one or more storage media 110 and a queried media drive of the one or more media drives 112 using the accessor unit and/or the one or more media drives 112.

In some embodiments, the library controller provides the gathered log data to the database 102, where they are stored together with various further instances of log data descriptive of further combinations of the one or more storage media 110 and the one or more media drives 112 (e.g., a "hosted log data"). In some embodiments, the database unit 102 comprises an integrated or external database server operating the actual database storage structure.

A portion of the hosted log data is transferred to the computing device 104 that executes a machine learning algorithm. The machine learning algorithm receives the instances of log data provided in said portion as an input and provides as an output a trained machine learning model for predicting a mount failure. The computer system 104 (e.g., a server) is adapted for executing the machine learning model for predicting a mount failure, e.g., in the media library 100.

Alternatively, the computer system 104 executes a further program to derive a rule-set representation of the trained machine learning model (e.g., comprising a chain of nested if-then-else conditional statements) and provides the rule-set representation to the library controller. In this case, the library controller is adapted for executing the rule-set representation of the machine learning model for providing a decentralized prediction of a mount failure in the media library 100.

In a usage scenario, the library controller receives a request for mounting a particular medium M. The library controller determines that a particular drive D is available for mounting medium M. The library controller acquires current log data for medium M and drive D (the "D-M data") and provides them to the computer system 104 as a first input for the machine learning model. In an alternative, the library controller provides the D-M data to the database 102, the database stores a copy of the received D-M data and forwards another copy to the computer system 104 as a first input for the machine learning model. In another alternative, the library controller provides the D-M data to the database 102 and uses the D-M data as a first input for the machine learning model or a rule-set representation of the machine learning model.

Depending on the embodiment, the library controller or the computer system 104 (e.g., an "identification module") executes the machine learning model or its rule-set representation to receive from its output a first prediction of a predicted failure cause category and a predicted failure probability assigned to the predicted failure cause category. The identification module provides the first prediction to the computer system 104 or the library controller executing a computer program (e.g., a "reaction module") that determines an appropriate response action as a function of the first prediction.

Figure 2:
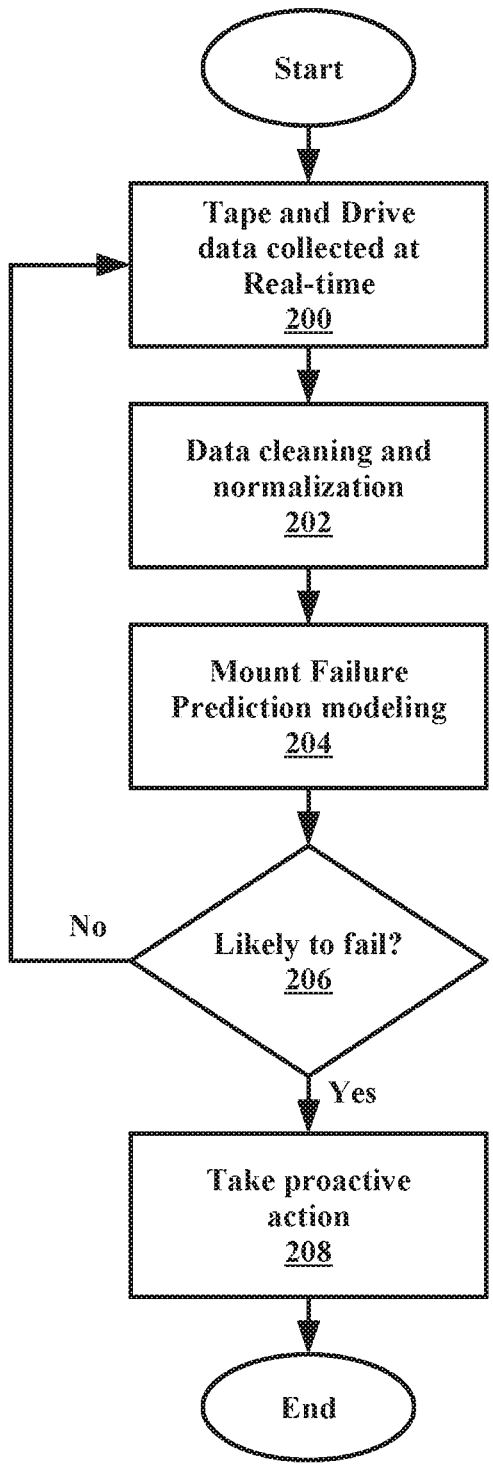
FIG. 2 illustrates a failure prediction method using a mount failure prediction machine learning model, in accordance with embodiments of the present disclosure.

Referring now to FIG. 2, illustrated is an example failure prediction method 250 using a mount failure prediction machine learning model, in accordance with embodiments of the present disclosure. In some embodiments, the method 250 may be performed by a processor, a computer system, etc. In some embodiments, the method 250 begins at operation 200. In some embodiments, the operations performed may be done in real-time, e.g., when a read/write operation/command is received by the processor. Operation 200 provides for collecting input data comprising log data of a queried storage medium and a queried media drive. In some embodiments, after operation 200, the method 250 proceeds to operation 202, which provides for data reduction of the log data to a subset of attributes that are considered relevant to the failure prediction, and for normalization of the log data to value ranges defined by the machine learning model.

In some embodiments, after operation 202, the method 250 proceeds to operation 204, which provides for and receives the log data as an input for the machine learning model, executes the machine learning model and receives from the output of the machine learning model a first prediction of a predicted failure cause category and a predicted failure probability assigned to the predicted failure cause category.

In some embodiments, after operation 204, the method 250 proceeds to a decision block 206. Decision block 206 checks whether the predicted failure probability fulfills a criterion of potential failure of the mount event, e.g., by comparison to a predefined probability threshold assigned to the same predicted failure cause category. If the criterion is not fulfilled, the method 250 continues with a repetition of operation 200 for another combination of a storage medium and a media drive. If the criterion is fulfilled, the method 250 proceeds to operation 208 which provides for a proactive action to prevent the mount event (e.g., by sending a notification to a workstation computer at a monitoring center, removing the potentially damaged storage medium from a library, switching off the potentially damaged media drive, or repeating the method 250 starting with operation 200 to determine whether the storage medium can be safely mounted by a different media drive).

Figure 3:
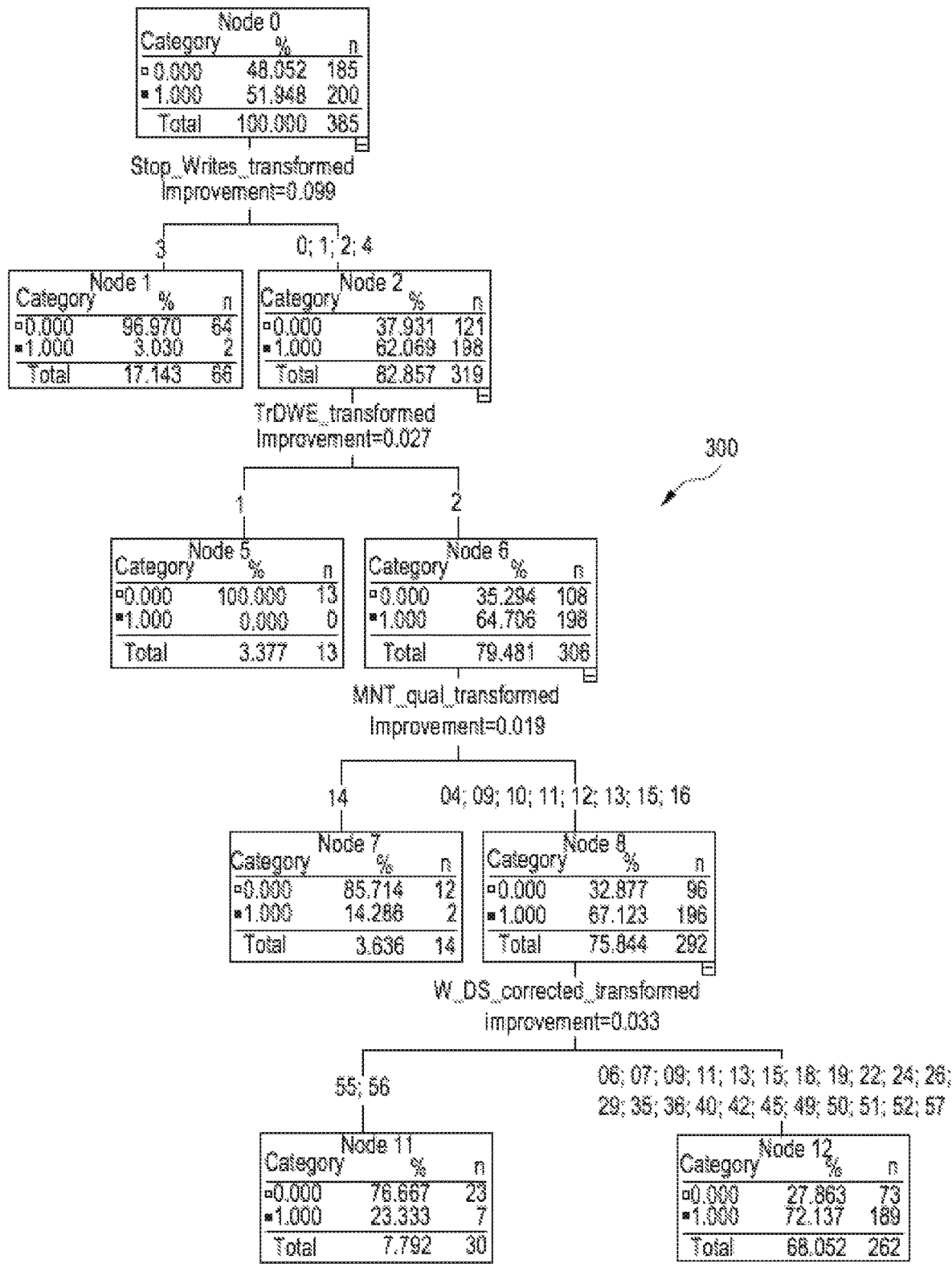
FIG. 3 illustrates a detail view of a mount failure prediction machine learning decision tree model, in accordance with embodiments of the present disclosure.
Figure 4:
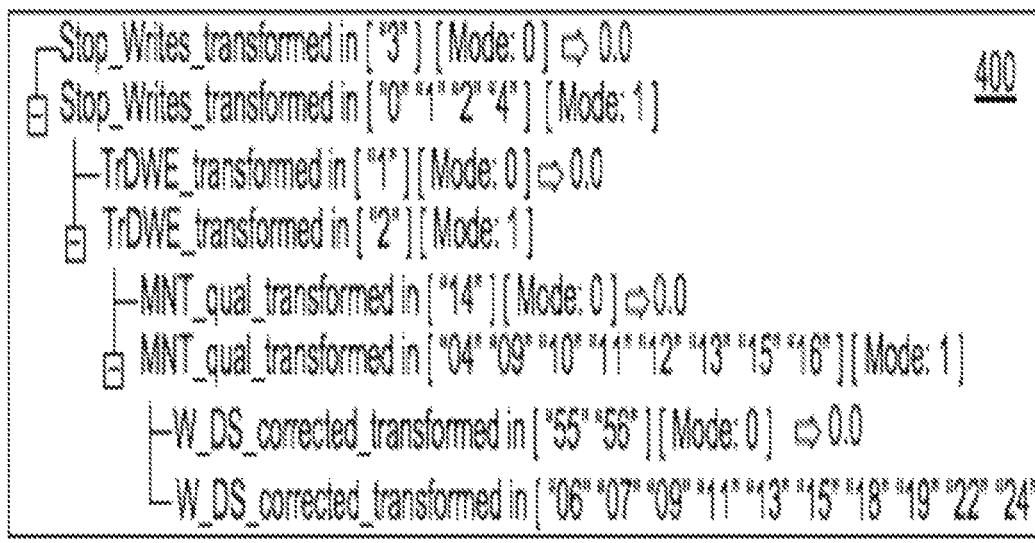
FIG. 4 illustrates part of a rule set of if-then-else statements representing a mount failure prediction machine learning decision tree model, in accordance with embodiments of the present disclosure.

Referring now to FIGS. 3 and 4, each showing an excerpt of a machine learning model comprising a trained decision tree model, where FIG. 3 illustrates a detail view of a mount failure prediction machine learning decision tree model 300, in accordance with embodiments of the present disclosure and FIG. 4 illustrates part of a rule set 400 of if-then-else statements representing a mount failure prediction machine learning decision tree model (e.g., 300 of FIG. 3), in accordance with embodiments of the present disclosure. The decision tree model 300 assigns the result value "0" to unacceptable mount events and the result value "1" to potentially acceptable mount events.

On a first node (Node 0 in FIG. 3), the decision tree model 300 interprets the value of the attribute "Stop_Writes_transformed". If the attribute value is "3," the mount event is considered unacceptable (Node 1 in FIG. 3). If the attribute value is "0," "1," "2," or "4," the decision tree model 300 continues with evaluating another attribute a further node (Node 2 in FIG. 3). On Node 2, the decision tree model 300 interprets the value of the attribute "TrDWE_transformed". If the attribute value is "1," the mount event is considered unacceptable (Node 5 in FIG. 3). If the attribute value is "2," the decision tree model 300 continues with evaluating another attribute on Node 6. Node 6 branches to Node 7 (attribute "MNT_qual_transformed" of value "14" unacceptable) and Node 8 (all other values of "MNT_qual_transformed" potentially acceptable). Node 8 branches to Node 11 (attribute value "W_DS_corrected_transformed" of value "55" or "56" unacceptable) and Node 12 (all other values of "W_DS_corrected_transformed" potentially acceptable).

Figure 5:
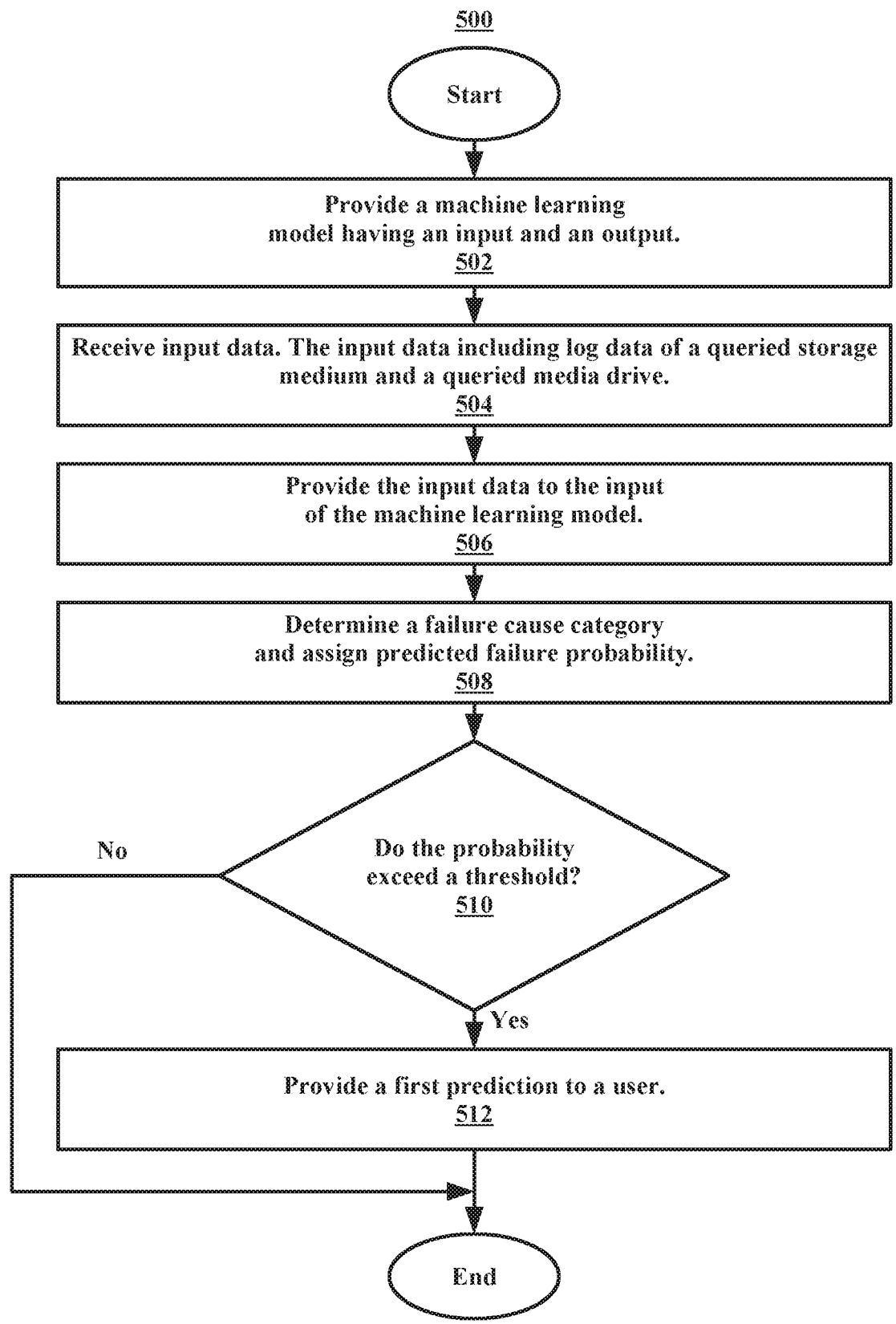
FIG. 5 illustrates a flowchart of an example method for providing a first prediction to a user, in accordance with embodiments of the present disclosure.

Referring now to FIG. 5, illustrated is an example method 500 for providing a first prediction to a user, in accordance with embodiments of the present disclosure. In some embodiments, the method 500 may be performed by a processor, a computer system, etc. In some embodiments, the method 500 begins at operation 502. At operation 502, a processor provides (e.g., to a server, to a computer system, to a database, etc.) a machine learning model having an input and an output.

In some embodiments, the method 500 proceeds to operation 504 where the processor receives input data. The input data includes log data of a queried storage medium and a queried media drive. In some embodiments, the log data of each of the queried storage medium and the queried media drive may be information/metadata/etc. (e.g., access count, information transfer speed, etc.) stored within memory (e.g., persistent, etc.) of each of the queried storage medium and the queried media drive. It is noted that the queried storage medium and the queried media drive are a storage medium and a media drive selected by an entity (e.g., a user, a computer system, etc.) for prospective mounting to/by one another.

In some embodiments, the method 500 proceeds to operation 506. At operation 506, the processor provides the input data to the input of the machine learning model. The machine learning model interprets the input data and produces the output in order to discern a likely failure cause between the queried storage medium and the queried media drive. In some embodiments, the method 500 proceeds to operation 508 where it is determined, from the output of the machine learning model, a predicted failure cause category (e.g., if the queried storage medium and the queried media drive will likely have a hardware failure, a connection pin failure, saving failure, etc.; each failure assigned to one or more categories of failure). Additionally at operation 508, a predicted failure probability is assigned to the predicted failure cause category (e.g., a numeric/quantitative value indicating the likelihood of the failure occurring). The method 500 proceeds to decision block 510 where it is determined if the probability exceeds a predicted failure threshold.

At decision block 510, if it is determined, from the predicted failure cause category and the assigned probability, that the mounting of the queried storage medium and the queried media drive will not fail (e.g., because the assigned probability does not reach and/or exceed a failure threshold), the method 500 ends. If, at decision block 510, it is determined, from the predicted failure cause category and the assigned probability, that the mounting of the queried storage medium and the queried media drive will fail (e.g., because the assigned probability reached and/or exceed a failure threshold), the method 500 proceeds to operation 512.

At operation 512 the processor provides a user with a first prediction. In some embodiments, the first prediction may detail the most likely cause for failure between the queried storage medium and the queried media drive (e.g., as determined by the predicted failure cause category and the assigned probability, the predicted failure cause category with the highest assigned probability displayed/relayed/provided to the user). In some embodiments, the first prediction may include a ranked list of all of the predicted failure cause categories with their associated assigned probabilities. After operation 512, the method 500 ends.

As an accompanying example of the method 500, a user may want to know if a particular storage medium can be connected and read by a legacy media drive. The user may turn to an online (e.g., cloud) database that has been uploaded with log data of a plethora of storage media and media drives. The user may select the type of storage medium and legacy media drive they are considering connecting to. The database may then search for model that can analyze and predict the probability of the storage medium and the legacy media drive being compatible.

The database may then provide the log data of the storage medium and the legacy media drive to the model for ingestion and analysis. The model may identify form the log data that the storage medium using a particular magnetic tape for storage (e.g., a first failure category), a particular read/write speed (e.g., a second failure category), and a mechanical dust screen (e.g., a third failure category). The model may additionally identify that the legacy media drive has laser reader (e.g., the first failure category because the reader is needed to access the information that is stored) and a certain read-operation speed (e.g., the second failure category because the read-operation speed of the legacy media drive and read/write speed of the storage medium are related).

The model may then determine a probability of the categories being an issue to the storage medium and the legacy media drive being compatible. For instance, on a scale of 0 to 1, the mechanical dust screen may be given a probability of failure of 0.1 because it is the only thing in its failure category. The read/write speed of the storage medium with the read-operation speed of the legacy media drive may be given a probability of 0.4 because they are related to one another in the same failure category and because the read speeds may be in an acceptable range of one another (e.g., the legacy media drive can read the information from the medium storage as fast as the medium storage can provide it; it is noted, that an updated model with more information regarding exact speeds will produce a more accurate probability). Lastly, the first failure category of the magnetic tape storage and the laser reader may be given a probability of 1 because the model may have determined that the magnetic tape of the storage medium and the type of laser in the legacy media drive are not compatible.

The model may provide the probabilities to the database as outputs and the database may forward/push the information to a display screen used by the user for the user to view. In some embodiments, the database may be coupled with the storage medium and the media drive, e.g., the user may have connected the storage medium and the media drive to a testing module and the database may directly access log data from each of the storage medium and the media drive. The database may further use a model to determine the storage medium and the media drive's compatibility and, because, the storage medium and the media drive are coupled to the database, the database may reconfigure mutable components either in the storage medium and/or the media drive (e.g., rotation speed of a storage plate, transfer speed rate [e.g., throttling], etc.) to make the storage medium and the media drive compatible (e.g., mountable together).

In some embodiments, the database may be a part of a neural network and/or utilize a neural network in order to predict the likelihood of the media drive and storage medium being compatible. The neural network allows the database to constantly refine subsequent predictions of media drive and storage medium compatibility by using the output generated for the exampled compatibility above as a new input for a training model.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, that can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
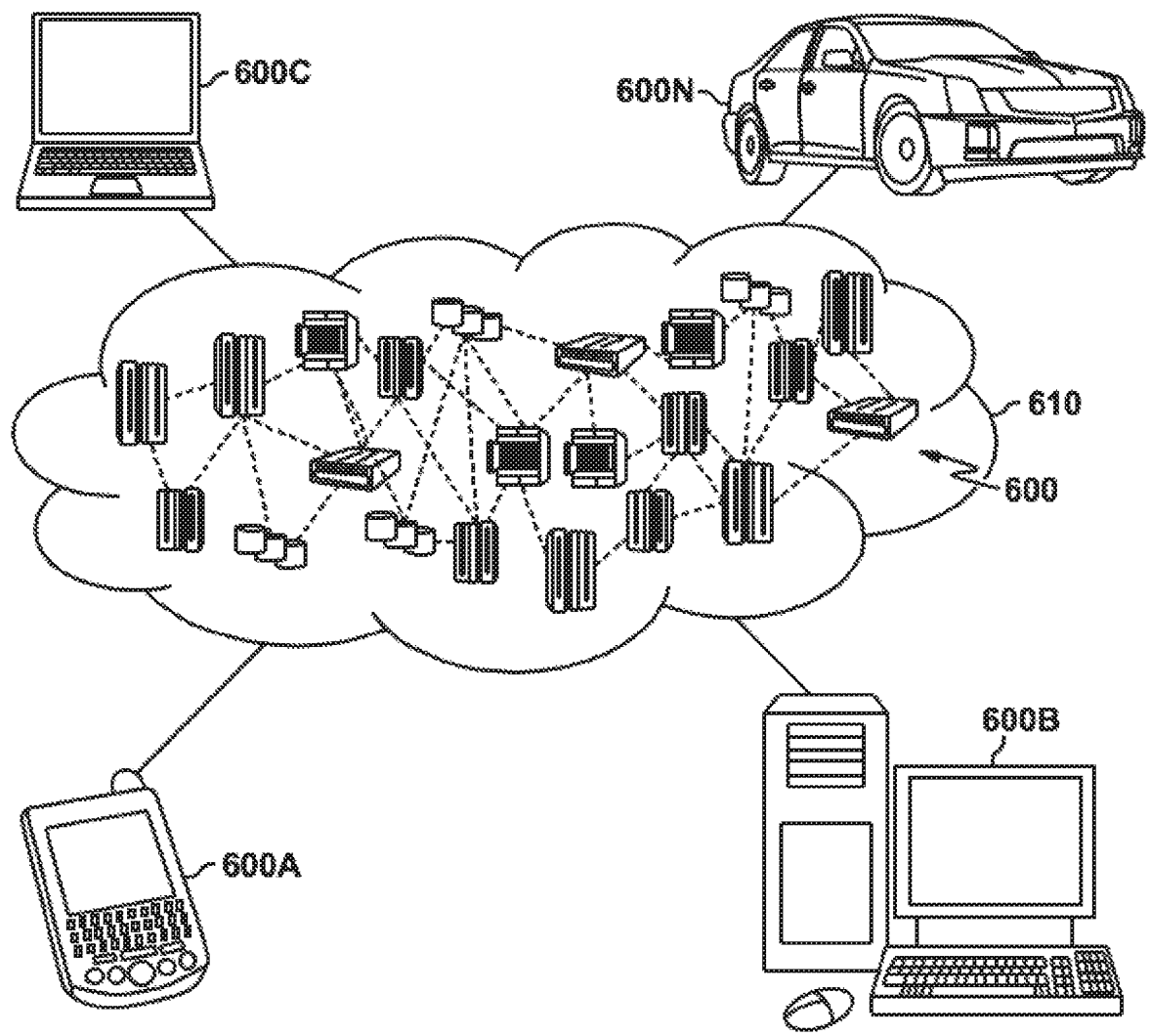
FIG. 6 depicts a cloud computing environment, in accordance with embodiments of the present disclosure.

Referring now to FIG. 6, illustrative cloud computing environment 610 is depicted. As shown, cloud computing environment 610 includes one or more cloud computing nodes 600 with that local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof.

This allows cloud computing environment 610 to offer infrastructure, platforms and/or software as services for that a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
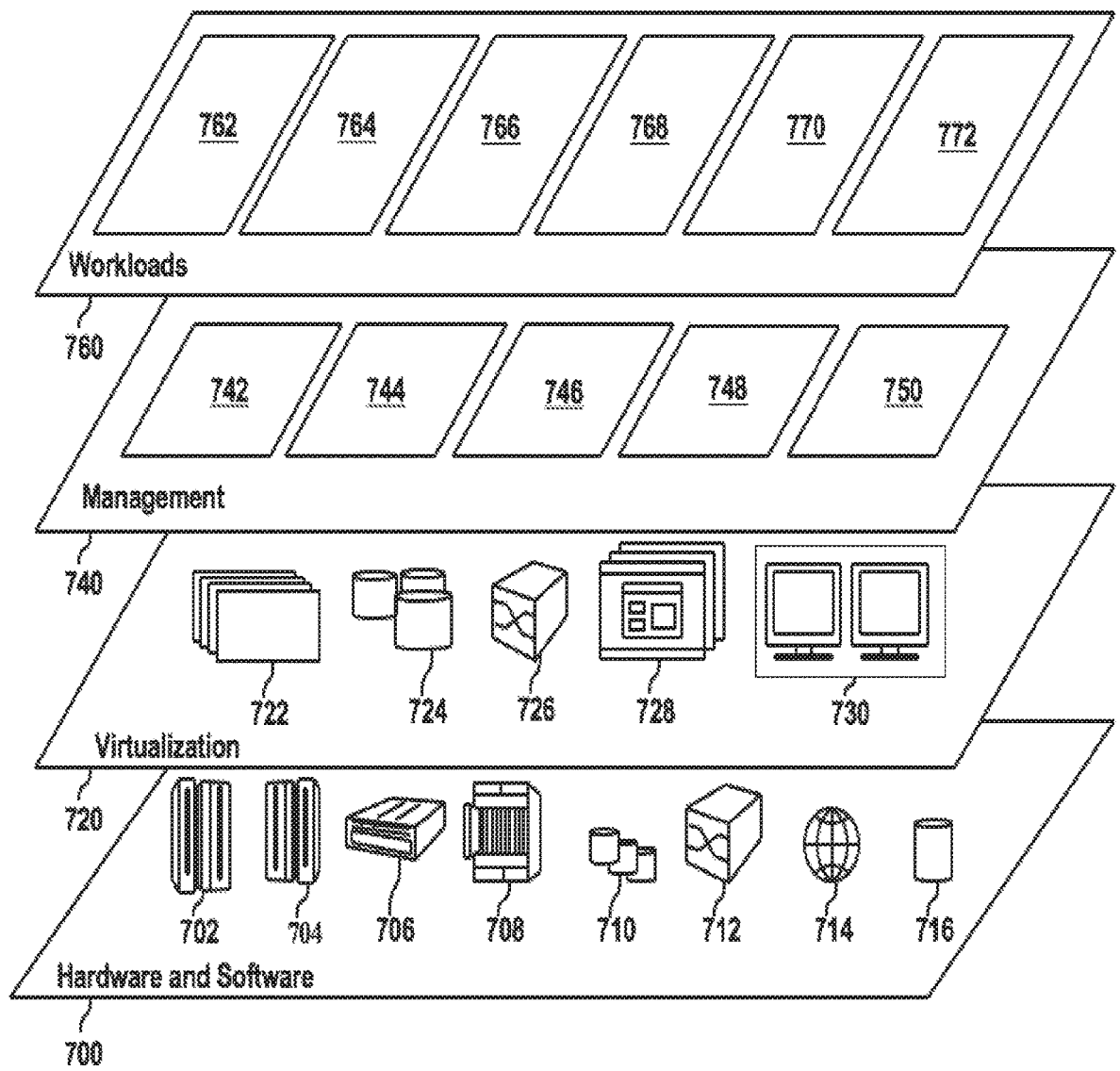
FIG. 7 depicts abstraction model layers, in accordance with embodiments of the present disclosure.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from that the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for that a future requirement is anticipated in accordance with an SLA.

Workloads layer 760 provides examples of functionality for that the cloud computing environment may be utilized. Examples of workloads and functions that may be provided from this layer include: mapping and navigation 762; software development and lifecycle management 764; virtual classroom education delivery 766; data analytics processing 768; transaction processing 770; and machine learning modeling 772.

Figure 8:
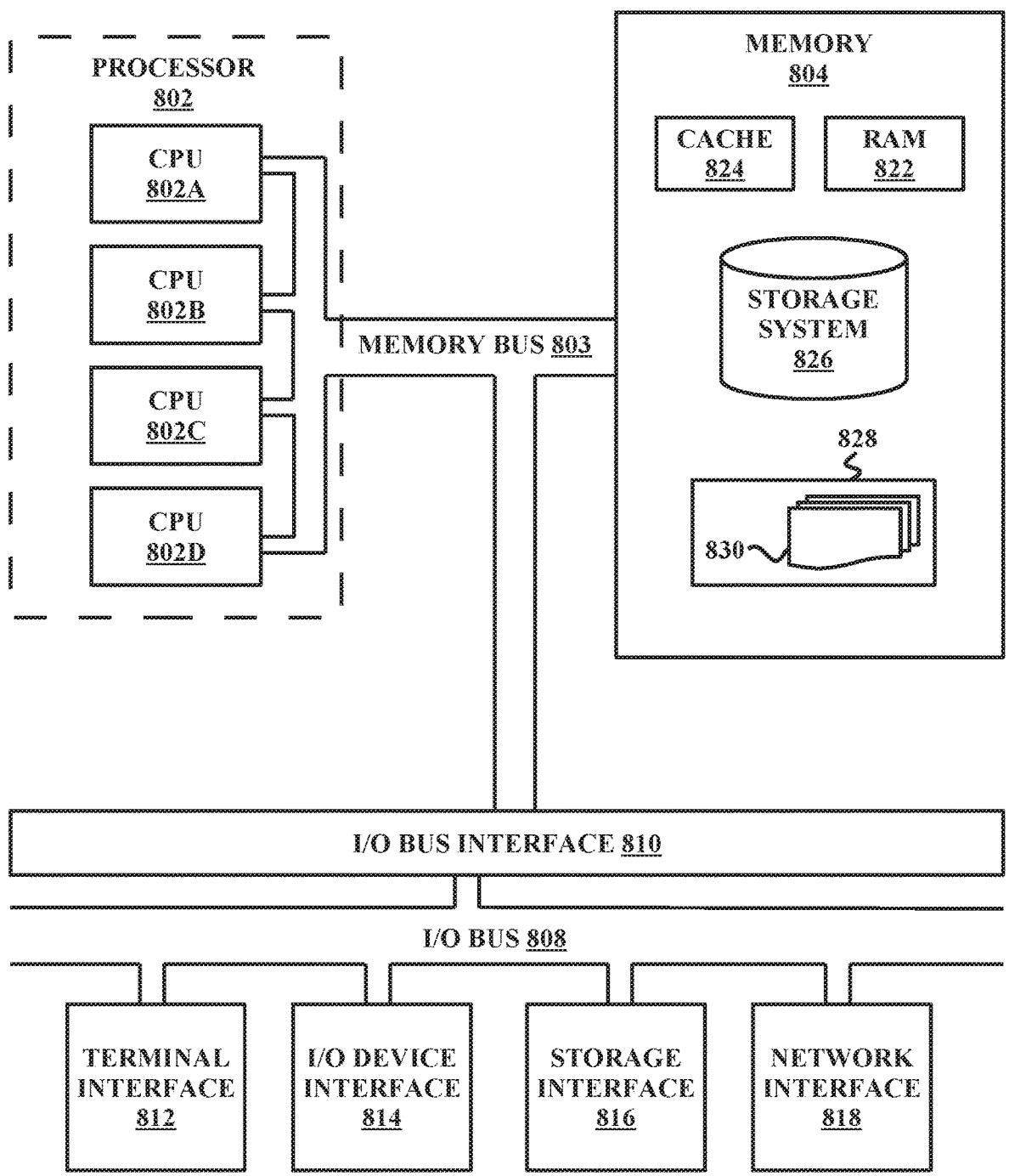
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of that may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, that may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, that separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, that execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions that execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, that comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for failure prediction of a queried mount event when mounting a queried storage medium by a queried media drive, the method comprising:
providing, by a processor, a machine learning model having an input and an output;
receiving input data, the input data including log data of the queried storage medium and the queried media drive, wherein the input data is generated by forcing a memory dump while the queried storage medium is mounted by the queried media drive, and by a memory readout while the storage medium is stored outside of the queried media drive;
providing the input data to the input of the machine learning model;
determining, from the output of the machine learning model, a predicted failure cause category and a predicted failure probability assigned to the predicted failure cause category; and
providing a first prediction to a user.

2. The method of claim 1, wherein the predicted failure cause category is a category from a predefined set of failure cause categories, the predefined set of failure cause categories including a medium category associated with the queried storage medium, a drive category associated with the queried media drive, and a permit category associated with the absence of a failure cause, wherein the medium category and the drive category are each assigned a predetermined probability threshold, the method further comprising:
performing a response action, wherein the response action comprises:
determining that the predicted failure probability assigned to the medium category does not exceed the predetermined probability threshold assigned to the medium category and that the predicted failure probability assigned to the drive category does not exceed the predetermined probability threshold assigned to the drive category; and
allowing the queried mount event.

3. The method of claim 1, wherein the predicted failure cause category is a category from a predefined set of failure cause categories, the predefined set of failure cause categories including a medium category associated with the queried storage medium, a drive category associated with the queried media drive, and a permit category associated with the absence of a failure cause, wherein the medium category and the drive category are each assigned a predetermined probability threshold, the method further comprising:
performing a response action, wherein the response action comprises:
determining that the predicted failure probability assigned to the medium category exceeds the predetermined probability threshold assigned to the medium category;
marking the queried storage medium as discontinued; and
sending a medium failure notification to a computing device of a monitoring center.

4. The method of claim 3, wherein the predefined set of failure cause categories further includes a combination category associated with the combination of the queried storage medium and the queried media drive, the method further comprising:
preventing, in response to determining that a predicted failure probability assigned to the combination category exceeds a predetermined probability threshold assigned to the combination category, the queried mount event for the combination of the queried storage medium and the queried media drive.

5. The method of claim 3, further comprising:
receiving, from the output of the machine learning model, a classification path assigned to the predicted failure probability;
storing in a path statistics file the classification path assigned to the predicted failure probability.

6. The method of claim 1, wherein providing the machine learning model comprises:
receiving one or more training sets, each of the one or more training sets including log data of past mount events, wherein a past mounting event is an event where a storage medium is mounted by a media drive and assigned a predicted failure cause category; and
generating, by executing a learning algorithm on the one or more training sets, the machine learning model.

7. The method of claim 6, wherein the learning algorithm includes a decision tree.

8. The method of claim 7, the decision tree is a classification and regression tree.

9. The method of claim 6, further comprising:
storing the input data in a database.

10. The method of claim 9, wherein the log data of the queried storage medium and the queried media drive includes a mount quality category, the mount quality category being selected from a set of mount quality categories, the method further comprising:
generating a quality statistics file, wherein the quality statistics file includes a counter value for each mount quality category in the set of mount quality categories, the generation of the quality statistics file comprising:
reading the mount quality category for the past mount events of the queried storage medium by the queried media drive stored in the database, and
increasing the counter value of a read mount quality category; and
providing the quality statistics file with the first prediction.

11. The method of claim 9, wherein the log data of the queried storage medium and the queried media drive includes a mount quality category, the mount quality category being selected from a set of mount quality categories, the method further comprising:
generating a quality statistics file, wherein the quality statistics file includes a medium-centered counter value for each mount quality category in the set of mount quality categories and a drive-centered counter value for each mount quality category in the set of mount quality categories, the generation of the quality statistics file comprising:
reading in the database the mount quality category for past mount events of the queried storage medium by a plurality of different media drives,
increasing the medium-centered counter value of each read mount quality category,
reading in the database the mount quality category for a past mount event of a plurality of different storage media by the queried media drive, and
increasing the drive-centered counter value of each read mount quality category; and
providing the quality statistics file with the first prediction.

12. The method of claim 9, further comprising:
receiving one or more updated training sets, each updated training set including log data of past mount event; and
generating, by executing the learning algorithm on the one or more updated training sets, an updated machine learning model.

13. The method of claim 12, further comprising:
generating, in response to detecting a failure event in the log data of the past mount event, a new updated training set.

14. The method of claim 1, further comprising:
receiving a request for mounting the queried storage medium; and
selecting, from a plurality of media drives, a first media drive for mounting the queried storage medium, the selection of the first media drive comprising:
providing, for each of the plurality of media drives, the input data for a combination of the queried storage medium and the queried media drive,
receiving a second prediction for the combination, the second prediction including a mount quality value,
ranking the media drives by the mount quality value in first order and by total mount count of each media drive in second order, and
selecting the highest-ranked idle media drive as the first media drive.

15. The method of claim 14, wherein the mount quality value includes the predicted failure probability.

16. A system for failure prediction of a queried mount event when mounting a queried storage medium by a queried media drive, the system comprising:
a memory; and
a processor in communication with the memory, the processor being configured to perform operations comprising:
providing a machine learning model having an input and an output;
receiving input data, the input data including log data of the queried storage medium and the queried media drive, wherein the input data is generated by forcing a memory dump while the queried storage medium is mounted by the queried media drive, and by a memory readout while the storage medium is stored outside of the queried media drive;
providing the input data to the input of the machine learning model;
determining, from the output of the machine learning model, a predicted failure cause category and a predicted failure probability assigned to the predicted failure cause category; and
providing a first prediction to a user.

17. The system of claim 16, wherein the predicted failure cause category is a category from a predefined set of failure cause categories, the predefined set of failure cause categories including a medium category associated with the queried storage medium, a drive category associated with the queried media drive, and a permit category associated with the absence of a failure cause, wherein the medium category and the drive category are each assigned a predetermined probability threshold, the operations further comprising:
performing a response action, wherein the response action comprises:
determining that the predicted failure probability assigned to the medium category does not exceed the predetermined probability threshold assigned to the medium category and that the predicted failure probability assigned to the drive category does not exceed the predetermined probability threshold assigned to the drive category; and
allowing the queried mount event.

18. A computer program product for failure prediction of a queried mount event when mounting a queried storage medium by a queried media drive, the computer program product comprising a computer readable storage medium having program instructions embodied therewith, the program instructions executable by a processor to cause the processor to perform a method, the method comprising:
providing a machine learning model having an input and an output;
receiving input data, the input data including log data of the queried storage medium and the queried media drive, wherein the input data is generated by forcing a memory dump while the queried storage medium is mounted by the queried media drive, and by a memory readout while the storage medium is stored outside of the queried media drive;
providing the input data to the input of the machine learning model;

determining, from the output of the machine learning model, a predicted failure cause category and a predicted failure probability assigned to the predicted failure cause category; and providing a first prediction to a user.

19. The computer program product of claim 18, wherein the predicted failure cause category is a category from a predefined set of failure cause categories, the predefined set of failure cause categories including a medium category associated with the queried storage medium, a drive category associated with the queried media drive, and a permit category associated with the absence of a failure cause, wherein the medium category and the drive category are each assigned a predetermined probability threshold, the method further comprising:

performing a response action, wherein the response action comprises:

determining that the predicted failure probability assigned to the medium category exceeds the predetermined probability threshold assigned to the medium category;

marking the queried storage medium as discontinued; and sending a medium failure notification to a computing device of a monitoring center.

* * * * *